C. E. BAKER.
VALVE ATTACHMENT OF PNEUMATIC TIRES AND THE LIKE.
APPLICATION FILED MAR. 15, 1915.
1,195,939.  Patented Aug. 22, 1916.
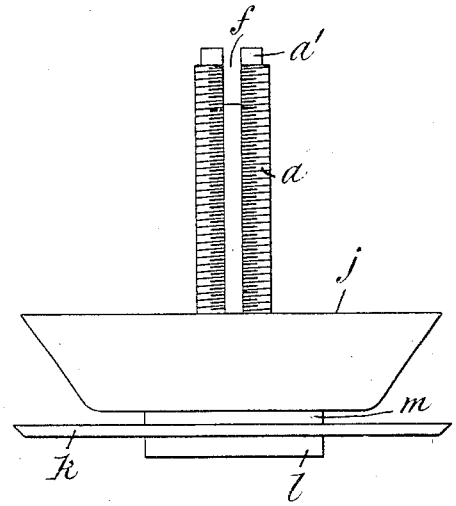
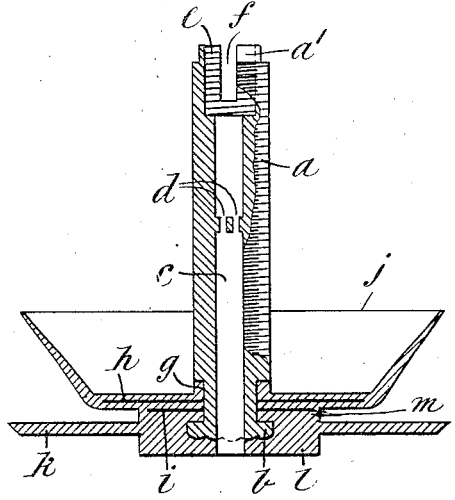
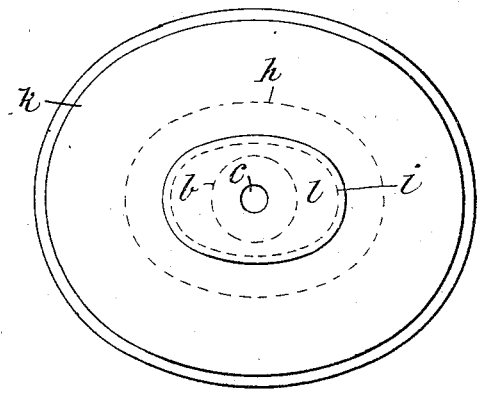
Witnesses
E. W. Bayly.
W. E. P. Bayly.
Inventor.
Charles Edgar Baker,
per John Pitt Bayly
Attorney.

UNITED STATES PATENT OFFICE.

CHARLES EDGAR BAKER, OF CARMARTHEN, WALES.

VALVE ATTACHMENT OF PNEUMATIC TIRES AND THE LIKE.

1,195,939.  Specification of Letters Patent.  Patented Aug. 22, 1916.

Application filed March 15, 1915. Serial No. 14,451.

*To all whom it may concern:*

Be it known that I, CHARLES EDGAR BAKER, a subject of the King of Great Britain, residing at 34 Blue street, Carmarthen, in the county of Carmarthenshire, in Wales, have invented a new and useful Improvement in or Appertaining to the Valve Attachments of Pneumatic Tires and the like, of which the following is a specification.

The invention relates to the valve attachments of the inner tubes of pneumatic tires and the like.

My invention consists of an improved combined valve and patch of india rubber, canvas or the like in which is provided an inside and outside flange, all molded and vulcanized together to form one solid whole, so that the valve and seating become integral parts of each other, the said valve being provided with the usual cushion base and surrounded with canvas or the like and vulcanized rubber.

The object of my invention is to so arrange a valve and the valve tab or patch in one piece that when fitted and cemented to the inner tube there will be very little possibility of the whole appliance becoming detached therefrom, neither will there be much chance of their becoming detached from each other so that when a tire is suddenly deflated or ridden slack the very frequent trouble of the valve leaking or pulling away from the inner tube or seating will be overcome; furthermore, the trouble of the air getting past the stem of the valve will be obviated. Usually a valve is simply inserted through a small hole in the tube and a piece of canvas stuck down or vulcanized on the outside thereof to prevent the hole enlarging.

In the accompanying drawings, Figure 1, is an elevation of the combined appliance; Fig. 2, is a sectional elevation of Fig. 1, and Fig. 3, is a plan of the bottom of Fig. 1.

My invention is constructed with any ordinary valve body or stem *a* which has the usual cushion head *b*. Between the screwed portion of the stem *a* and the head *b* where the stem is usually reduced, the canvas and the india rubber are inserted and fixed as shown in Fig. 2. The stem *a* is provided with the usual channel to form the airway *c*. The stem at *g* and the head *b* are embedded in canvas, together with india rubber or the like at *h* and *i*. The india rubber portion of this appliance is formed with an outside flange (preferably cup shaped) *j*.

*m* and *l* are the center plate, as shown in Figs. 1, and 2.

In this invention the valve is molded and vulcanized to a separate appliance which in turn is itself fitted to the inner tube of a pneumatic tire or the like. The appliance through the center of which the valve becomes molded and fixed, is built up of three parts of india rubber or the like in which are several layers of canvas or other more or less inextensible material to resist the strain of the valve and when vulcanized together, one part or inner flange *k* goes inside the inner tube of the tire, the second part or stem *m* fills the hole cut out of the inner tube of the tire to allow for insertion, and the third or top part *j* is solutioned or fastened down on the outside of the inner tube in the usual manner. *e* is a female screw, and *d* are the holes in the valve seating in the stem *a*. The appliance is then ready for the tube.

It will be readily understood with a valve molded together as described with a combination of a patch of india rubber and canvas or the like, and becoming an integral part thereof, there will be no danger of the valve pulling away from the said seating, or the whole appliance pulling away from the inner inflated tube, thereby obviating the present trouble of metal chafing the inside of the inner tube.

I claim:

In combination with a valve stem of a seating therefor, said seating composed of india rubber having layers of canvas embedded therein, and provided with inside and outside flanges, said valve and seating being vulcanized to the valve stem to form one solid whole so that the valve stem and seating become integral parts of each other, to be fitted and cemented to an inner inflated tube of a pneumatic tire, the material of the inner tube being disposed between said inner and outer flanges.

CHARLES EDGAR BAKER.

Witnesses:
SAMUEL SHIPTON,
HUGH T. STEPHENS.